US010960589B2

(12) United States Patent
Tuong The

(10) Patent No.: US 10,960,589 B2
(45) Date of Patent: Mar. 30, 2021

(54) MOLD CHANGING APPARATUS

(71) Applicant: Nichietsu Inc., Kanagawa (JP)

(72) Inventor: Hien Tuong The, Kanagawa (JP)

(73) Assignee: NICHIETSU INC., Kanagawa (JP)

( * ) Notice: Subject to any disclaimer, the term of this patent is extended or adjusted under 35 U.S.C. 154(b) by 0 days.

(21) Appl. No.: 16/526,609

(22) Filed: Jul. 30, 2019

(65) Prior Publication Data

US 2020/0039131 A1 Feb. 6, 2020

(30) Foreign Application Priority Data

Aug. 1, 2018 (JP) .............................. JP2018-145144

(51) Int. Cl.
*B29C 45/17* (2006.01)
*B29C 31/00* (2006.01)

(52) U.S. Cl.
CPC ........ *B29C 45/1756* (2013.01); *B29C 31/006* (2013.01)

(58) Field of Classification Search
CPC ........................... B29C 45/1756; B29C 31/006
See application file for complete search history.

(56) References Cited

U.S. PATENT DOCUMENTS

| 5,656,903 A * | 8/1997 | Shui ........................ B25J 3/04 318/568.1 |
| 2002/0096060 A1* | 7/2002 | Kohno .................... B30B 1/186 100/35 |
| 2018/0009146 A1* | 1/2018 | Nakamura ............ B29C 45/332 |

FOREIGN PATENT DOCUMENTS

| CN | 108059060 | 5/2018 | |
| DE | 4219920 A1 * | 1/1993 | ......... B29C 45/1756 |
| JP | 2018-001738 | 1/2018 | |

* cited by examiner

*Primary Examiner* — Joseph S Del Sole
*Assistant Examiner* — Jerzi H Moreno Hernandez
(74) *Attorney, Agent, or Firm* — Hamre, Schumann, Mueller & Larson, P.C.

(57) ABSTRACT

A mold changing apparatus includes a conveyance unit that is configured to generate a driving force for positioning the mold in addition to loading and unloading the mold into and from an injection molding machine, and a fluid pressure cylinder to assist acceleration and deceleration of the mold in cooperation with the conveyance unit.

3 Claims, 8 Drawing Sheets

MOLD CHANGING APPARATUS

BACKGROUND

Technical Field

The present invention relates to a mold changing apparatus that is provided side by side with an injection molding machine and loads and unloads a mold into and from the injection molding machine.

Related Art

There has been increasing demand for low-volume high-variety production by injection molding, due to diversified needs in recent years. Therefore, the replacement frequency of a mold used in an injection molding machine tends to increase.

It is required that the time required for the above-described mold replacement be shortened in order to increase productivity.

In order to address such a demand, JP 2018-001738 A discloses a technique of accelerating and decelerating a mold through up-and-down movements of a weight. In JP 2018-001738 A, an electric actuator has used as a main component for moving a mold and the weight has connected to the mold.

[Patent Document 1] JP 2018-1738 A

According to the method disclosed in JP 2018-001738 A, the weight is set at the uppermost position at a reference position where the mold completes its movement in a mold changing apparatus or an injection molding machine. Then the weight is lowered in synchronization with the movement of the mold by a half or less of a moving stroke and reaches the lowermost position. The weight starts to rise and stops at the target position when the mold approaches a target position.

As a result, upon acceleration of the mold, the weight is pulled and lowered by gravity to accelerate the mold. Therefore, it makes possible to achieve high acceleration as compared with a configuration where a drive unit such as an electric actuator is used alone.

Further, upon deceleration of the mold, the weight changes to rise to exert a force on the mold to decelerate the mold. It makes possible to achieve higher deceleration as compared with the configuration where a drive unit such as an electric actuator is used alone.

SUMMARY

However, according to the method disclosed in JP 2018-001738 A, since the weight is located at a high position with the mold located at a movement start position, it is required that work for example, fixing the position of the mold be made in order to attach or detach the mold onto or from the mold changing apparatus.

There is also a method of connecting the weight to the drive unit such as an electric actuator. Generally, when the mold is attached or detached onto or from the mold changing apparatus, the mold changing apparatus is powered off for safety. However, it may cause the drive unit such as an electric actuator to move due to a weight of the weight.

When the mold is located near the reference position such as in the mold changing apparatus or the injection molding machine, a force for moving the mold is constantly applied to the mold, which requires the drive unit to produce a force for keeping the mold stopped. Thus, it requires power supply even while the mold is stopped.

Further, when power supply to the drive unit such as the electric actuator is cut off due to an emergency stop or a power failure, the weight may cause the mold to move and come into contact with another mold.

As a method of preventing the mold from moving when the power supply is cut off, there is a method using a motor with a brake mechanism in the drive unit. However, a holding force applied by the brake mechanism which is produced by a friction force caused by brake linings and the like, and thus it is not desirable to use the brake mechanism on a daily basis because the brake mechanism has a lifetime.

In order to make the acceleration and deceleration of the mold higher, it is required that a heavier weight be installed within a range where the drive unit can make control without difficulty.

However, up-and-down movements of such a heavy weight may cause vibration in the mold changing apparatus or the injection molding machine.

Further, when the movement of the weight changes from rising to falling rapidly, a large impact is applied to wire members such as chains and wires and rotating members such as rollers and sprockets. Therefore, it is required to use members having sufficiently high strength and to replace members regularly.

Further, since it is necessary to provide a space for moving the weight up and down in the mold changing apparatus, it may be necessary to increase the size of the mold changing apparatus.

In light of the foregoing problems of the above mentioned conventional technique, an object of the present invention is to provide a mold changing apparatus excellent in handleability, safety, energy saving, and space efficiency while achieving high acceleration and deceleration of a mold at the time of changing the mold.

A mold changing apparatus according to the present invention provided side by side with an injection molding machine includes a main conveyance unit configured to load and unload a mold into and from the injection molding machine, the conveyance unit being capable of producing a driving force for positioning the mold, and a power assist unit configured to assist the conveyance unit in accelerating and decelerating the mold.

Such a configuration allows the mold to be moved by the driving force applied by the conveyance unit between an unloading position where the mold is detached from the injection molding machine and a loading position where the mold is attached onto the injection molding machine.

A pressing force directed forward in a conveyance direction is applied to the mold by the power assist unit when conveyance of the mold starts.

This pressing force acts as an auxiliary driving force on the driving force applied by the conveyance unit.

As described above, at the start of conveyance of the mold, a conveying force applied to the mold can be amplified by adding the auxiliary driving force that is the pressing force applied by the power assist unit to a conveying force that is the driving force applied by the conveyance unit.

It makes possible to increase a change in the conveyance speed of the mold as compared with a configuration where the main conveyance unit is used alone.

On the other hand, when the mold approaches a predetermined conveyance position, the conveyance speed the mold is reduced by the driving force applied by the conveyance unit.

The power assist unit cooperates with a decelerating operation by the conveyance unit to apply a pressing force in a direction opposite to the conveyance direction and to assist in decelerating the mold.

Accordingly, upon deceleration of the mold, the decelerating force applied to the mold can be amplified by adding an auxiliary decelerating force that is the pressing force applied by the power assist unit to the decelerating force applied by the conveyance unit.

It makes possible to increase a change in the conveyance speed upon deceleration of the mold.

Such a larger change in the conveyance speed upon acceleration or deceleration of the mold makes it possible to increase a loading and unloading speed of the mold to shorten the time required for the mold changing.

Herein, for example, a fluid pressure cylinder using pneumatic pressure or hydraulic pressure is suitably used as the power assist unit that increases the driving force applied by the conveyance unit for loading and unloading.

The fluid pressure cylinder has a simple structure formed of a cylinder body and a piston rod and thus is inexpensive.

Controlling opening and closing of valves connected to the fluid pressure cylinders allows the fluid pressure cylinders to generate an output only when necessary.

Further, since the output can be easily set by adjusting the pressure in each of the fluid pressure cylinders, downsizing is easy.

Therefore, it is possible to make the mold changing apparatus excellent in handleability, safety, energy saving, and space efficiency while achieving high acceleration and deceleration.

The conveyance unit may be an actuator that includes a towing unit to which the mold is coupled and forms a linear conveyance path.

This actuator may be, for example, an electric actuator constituted by a combination of a servomotor, a ball screw, and a linear bearing. The actuator may also be any actuator capable of producing a driving force for linearly moving the mold.

The electric actuator is capable of, for example, stopping, at a stop position on the linear bearing having a linear shape, a nut portion serving as a towing unit that moves on an axis of the ball screw and holding the nut portion at the stop position. Therefore, the electric actuator makes it possible to move or stop the mold connected to the nut portion with high accuracy.

Further, the power assist unit can be disposed along the electric actuator, since the electric actuator has a linear outer shape.

This allows the components of the conveyance unit to be compactly arranged. Thus, it allows the installation space to be kept small.

It is preferable that a tip the piston rod of the fluid pressure cylinder be provided with an engaging portion that is detachably engaged with the nut portion.

Such a configuration allows the power assist unit and the mold to be coupled to each other with the nut portion.

This makes it possible to simplify the structure of transmitting the driving force applied by the power assist unit to the mold.

A single-acting cylinder of a retracting type or a double-acting cylinder is used as the fluid pressure cylinder. Pneumatic pressure or hydraulic pressure is used as a fluid that drives the fluid pressure cylinder.

According to the mold changing apparatus of the present invention, it is possible to provide a mold changing apparatus excellent in handleability, safety, energy saving, and space efficiency while achieving high acceleration and deceleration of the mold at the time of mold changing.

DETAILED DESCRIPTION

Figure 1:
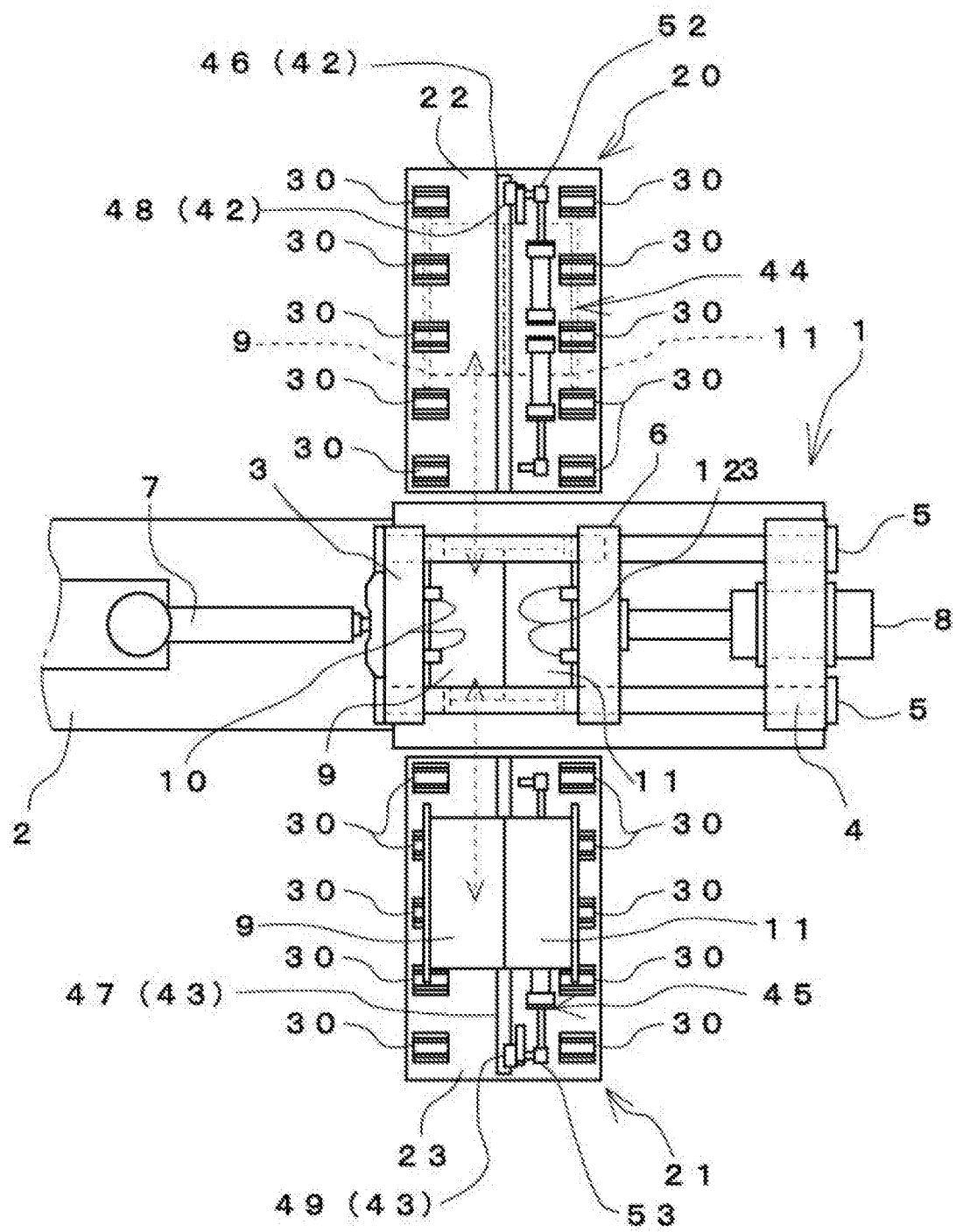
FIG. 1 is a plan view of an injection molding machine to which an embodiment of a mold changing apparatus according to the present invention is applied.

An embodiment of the present invention will be described with reference to the drawings.

First, descriptions will be given as to a configuration of an injection molding machine to which the embodiment of the present invention is applied, and a procedure for changing the mold in the injection molding machine with reference to FIG. 1.

In these drawings, reference sign 1 represents the injection molding machine.

The injection molding machine 1 includes: a base 2; a pair of parallel fixed platens 3 and 4 that is fixed and bonded to the base 2 with spacing therebetween; four tie bars 5 that are integrally installed between the fixed platens 3 and 4 (only the two tie bars arranged on the upper side are illustrated in the drawings); a movable platen 6 that is slidably attached to the tie bars 5 between both the fixed platens 3 and 4; an injection cylinder 7 that is provided on the one fixed platen 3 side to inject a molding resin; and a clamping device 8 that is attached to the other fixed platen 4 to press the movable platen 6 toward the one fixed platen 3.

A fixed mold 9 is detachably fixed by clamps 10 to the surface of the one fixed platen 3 opposed to the movable platen 6 (mold attachment surface). A movable mold 11 is detachably fixed by clamps 12 to the surface of the movable platen 6 opposed to the one fixed platen 3 (mold attachment surface).

Mold changing apparatuses 20 and 21 are provided side by side with the injection molding machine 1 at facing positions between the one fixed platen 3 and the movable platen 6 to change the fixed mold 9 and the movable mold 11.

The mold changing apparatuses 20 and 21 include bases 22 and 23 almost orthogonal to the base 2 of the injection molding machine 1. A large number of rollers 30 are arranged on the upper surfaces of the bases 22 and 23 to support the fixed mold 9 and the movable mold 11 (hereinafter, referred to as a mold (9, 11)).

These rollers 30 are arranged so that the conveyance direction is orthogonal to the tie bars 5 and are mounted in two rows on the bases 22 and 23 with spacing therebetween in the longitudinal direction of the tie bars 5.

Figure 2:
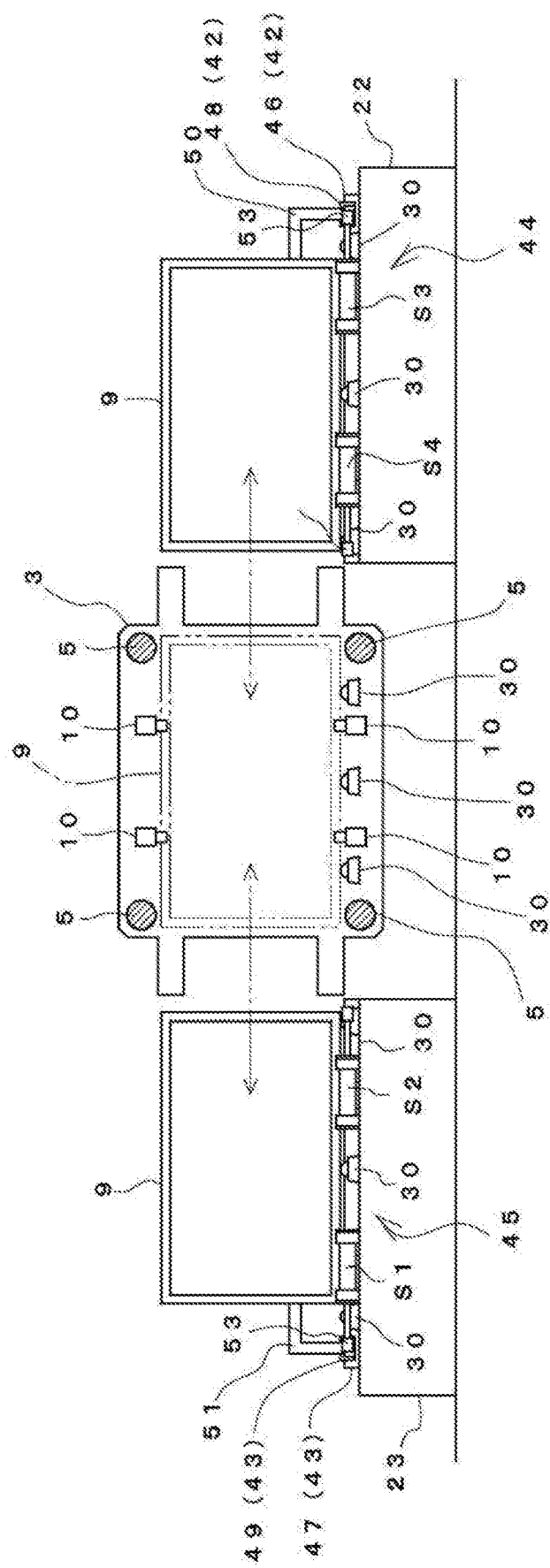
FIG. 2 shows the injection molding machine to which the embodiment of the mold changing apparatus according to the present invention is applied, as viewed from a mold attachment surface of a fixed mold.

Further, the rollers 30 are installed on the mold attachment surfaces of the fixed platen 3 and the movable platen 6 as illustrated in FIG. 2 (note that FIG. 2 shows a state where the rollers 30 are installed only on the fixed platen 3).

Further, the mold changing apparatuses 20 and 21 according to the present embodiment are provided on the bases 22 and 23.

As illustrated in FIG. 1, the mold changing apparatuses 20 and 21 include electric actuators 42 and 43 arranged between the rows of the rollers 30 on the bases 22 and 23 and parallel to the row direction and a pair of power assist units 44 and 45 arranged along the electric actuators 42 and 43.

The pair of mold changing apparatuses 20 and 21 according to the present embodiment has the same configuration each other and are arranged symmetrical with the injection molding machine 1 interposed therebetween. A description will be given below of one mold changing apparatus 21, and reference signs in parentheses denoting components of the other mold changing apparatus 20 are appended to reference signs for the one mold changing apparatus 21.

More specifically, the electric actuator 43 (42) includes a linear bearing 47 (46) linearly disposed between the rows of the rollers 30 and a slider 49 (48) serving as a towing unit movably attached to the linear bearing and coupled to the mold.

As illustrated in FIG. 2, the fixed mold 9 is integrally coupled to the slider 49 (48) with a coupling arm 51 (50) to allow the fixed mold 9 to move in synchronization with the slider 49 (48) along the linear bearing 47 (46).

Figure 3:
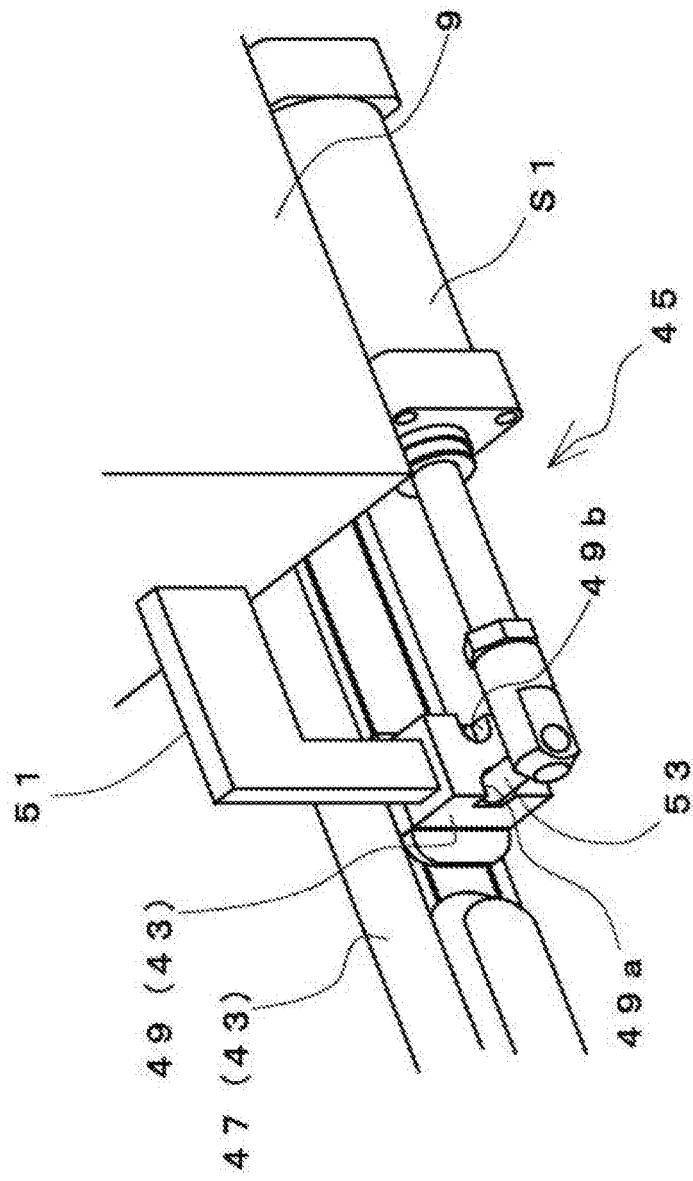
FIG. 3 is an enlarged perspective view of a drive unit of the embodiment of the mold changing apparatus according to the present invention.

First, a description will be given of a configuration of the slider 49 (48) with reference to FIG. 3.

On both sides of the slider 49 (48), engaging grooves 49a and 49b (48a and 48b) opened forward and backward in the conveyance direction are formed.

According to the present embodiment, the power assist unit 45 uses a pair of fluid pressure cylinders S1 and S2 (S3 and S4) actuated by compressed air. The fluid pressure cylinders S1 and S2 (S3 and S4) are single-acting cylinders of a retracting type.

As illustrated in FIG. 2, the fluid pressure cylinders S1 and S2 (S3 and S4) are arranged opposite to each other. An engaging pin 53 (52), which being detachably engaged with the slider 49 (48) through the openings of the engaging grooves 49a and 49b (48a and 48b), is provided at a tip of a piston rod of each fluid pressure cylinders S1 and S2 (S3 and S4).

According to the present embodiment, the engaging pin 53 serves as an engaging portion between the slider 49 (48) and a corresponding one of the fluid pressure cylinders S1 and S2 (S3 and S4).

Next, a description will be given of a drive system of the fluid pressure cylinders S1 and S2 with reference to FIG. 4.

Compressed air supply pipes P1 and P2 for feeding the compressed air to retract the piston rods are each connected to a corresponding one piston chamber of each of the fluid pressure cylinders S1 and S2 (S3 and S4).

An air compressor A that feeds the compressed air is connected to the compressed air supply pipes P1 and P2, and solenoid valves V1 and V5 are each provided in the middle of each air supply pipes P1 and P2.

Further, solenoid valves V2 and V6 and relief valves V3 and V7 are connected between the fluid pressure cylinders S1 and S2 and the solenoid valves V1 and V5 in the compressed air supply pipes P1 and P2.

Solenoid valves V2 and V5 each cause a corresponding one of the compressed air supply pipes P1 and P2 to communicate with and be shut off from the atmosphere.

Relief valves V3 and V7 each prevent pressure in a corresponding one piston chamber from rising to and above a predetermined value.

On the other hand, intake and exhaust pipes P3 and P4 are each connected to the other piston chamber of a corresponding one of the fluid pressure cylinders S1 and S2 S3 and S4). The solenoid valves V4 and V8 that each open and close a corresponding one of the intake and exhaust pipes P3 and P4 are connected to the intake and exhaust pipes P3 and P4.

Respective drive units of the solenoid valves V1, V2, V4, V5, V6 and V8 are electrically connected to a control unit C. The solenoid valves V1, V2, V4, V5, V6 and V8 are individually opened and closed in accordance with a control signal from the control unit C.

Although the relief valves V3 and V7 may be opened and closed in accordance with a control signal from the control unit C as with the other solenoid valves, it is more reliable to use mechanical relief valves that do not require such control.

Further, the electric actuator 43 (42) is electrically connected to the control unit C, and information such as position information, speed information, and thrust information on the slider 49 is sent from the electric actuator to the control unit C.

Figure 4:
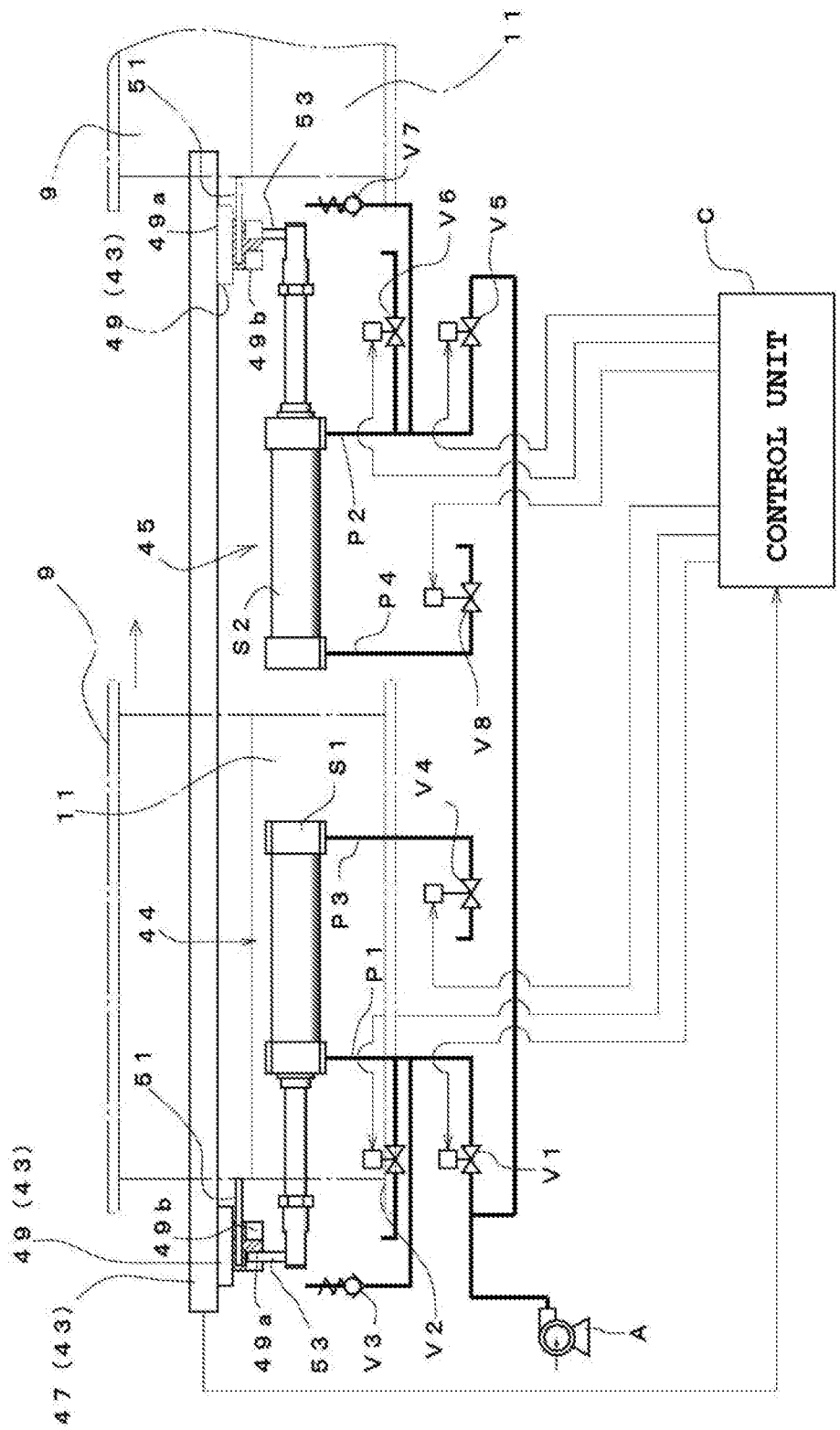
FIG. 4 is a schematic view of the embodiment of the mold changing apparatus according to the present invention, showing a procedure for changing the mold.

As illustrated in FIG. 4, the mold changing apparatus (20) according to the present embodiment move the mold (9, 11) between an unloading position on the mold changing apparatus 21 (20) and a loading position in the injection molding machine 1.

A description will be given below of an operation of loading the mold (9, 11).

The slider 49 (48) to which the fixed mold 9 is connected is kept stopped at a standby position by the electric actuator 43 (42) with the mold (9,11) held at the unloading position.

Further, as illustrated in FIG. 4, the engagement groove 49a that opens to the rear of the slider 49 (48) in the conveyance direction extends the fluid pressure cylinder S1 (S3) disposed downstream in the conveyance direction. An engagement pin 53 (52) provided in the fluid pressure cylinder S1 (S3) is engaged.

Herein, each of the solenoid valves is controlled, for example, under the following condition 1.

Condition 1:

Solenoid valve V1: Closed, and solenoid valves V2 and V4: Open.

This condition is able keep the fluid pressure cylinder S1 (S3) in a stopped state.

Figure 5:
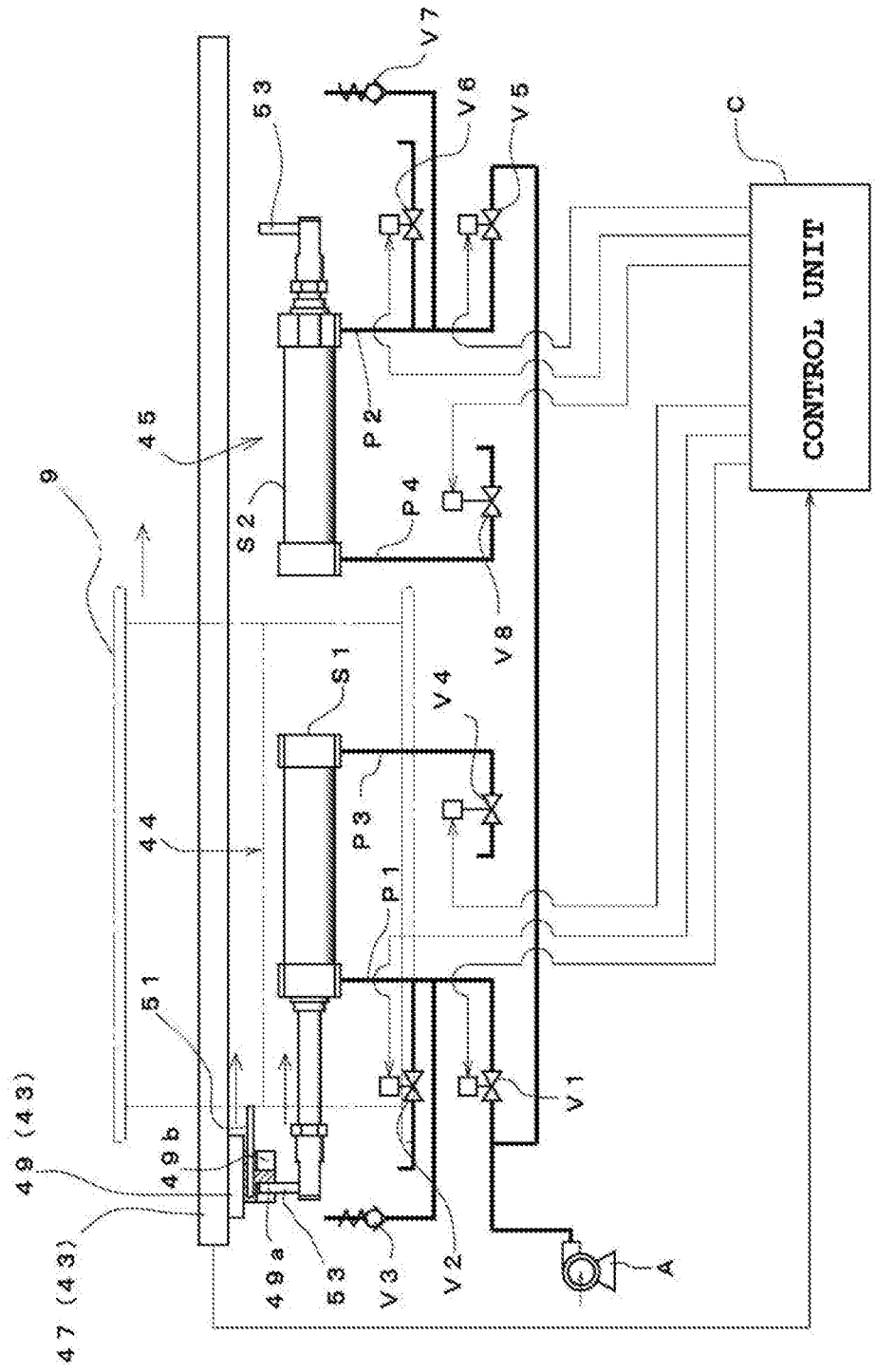
FIG. 5 is a schematic view of the embodiment of the mold changing apparatus according to the present invention, showing the procedure for changing the mold.

The mold (9, 11) at the standby position is moved toward the injection molding machine 1 in synchronization with the slider 49 (48) as indicated by an arrow shown in FIG. 5 by a driving force applied by the electric actuator 43 (42).

At the start of actuation of the electric actuator 43 (42), each of the solenoid valves is controlled under the following condition 2.

Condition 2

Solenoid valves V1 and V4: Open, and solenoid valve V2: Closed.

Condition 2 makes the compressed air to be fed to the one cylinder chamber of the fluid pressure cylinder S1 (S3) through the compressed air supply pipe P1.

Under such control, the fluid pressure cylinder S1 (S3) is actuated to retract, and the engaging pin 53 (52) provided on the fluid pressure cylinder S1 (S3) presses the slider 49 (48) in the engaged state toward the injection molding machine 1 as indicated by the arrow shown in FIG. so as to increase the driving force.

Therefore, in addition to a conveying force applied by the electric actuator 43 (42), a pressing force applied by the fluid pressure cylinder S1 (S3) additionally acts on the mold (9, 11).

This amplifies the conveying force acting on the mold (9, 11) to increase a travel speed of the mold (9, 11) (that is, a conveyance speed).

Note that the control of each of the solenoid valves described above for conveyance assistance can also be performed before loading the mold.

This is effective for preventing a delay in timing at which the pressing force is produced due to that it takes a certain time to feed factory air that is compressed air to the fluid pressure cylinder S1 (S3) to increase the pressure to a sufficient level.

Although the mold (9, 11) is conveyed in an accelerated state, during the conveyance, the fluid pressure cylinder S1 (S3) fully retracts, or the solenoid valve is controlled under the following condition 3 or condition 4, the actuation of the fluid pressure cylinder S1 (S3) is stopped.

Condition 3:
Solenoid valve V1: Closed.
Condition 4:
Solenoid valves V1 and V4: Closed.

Figure 6:
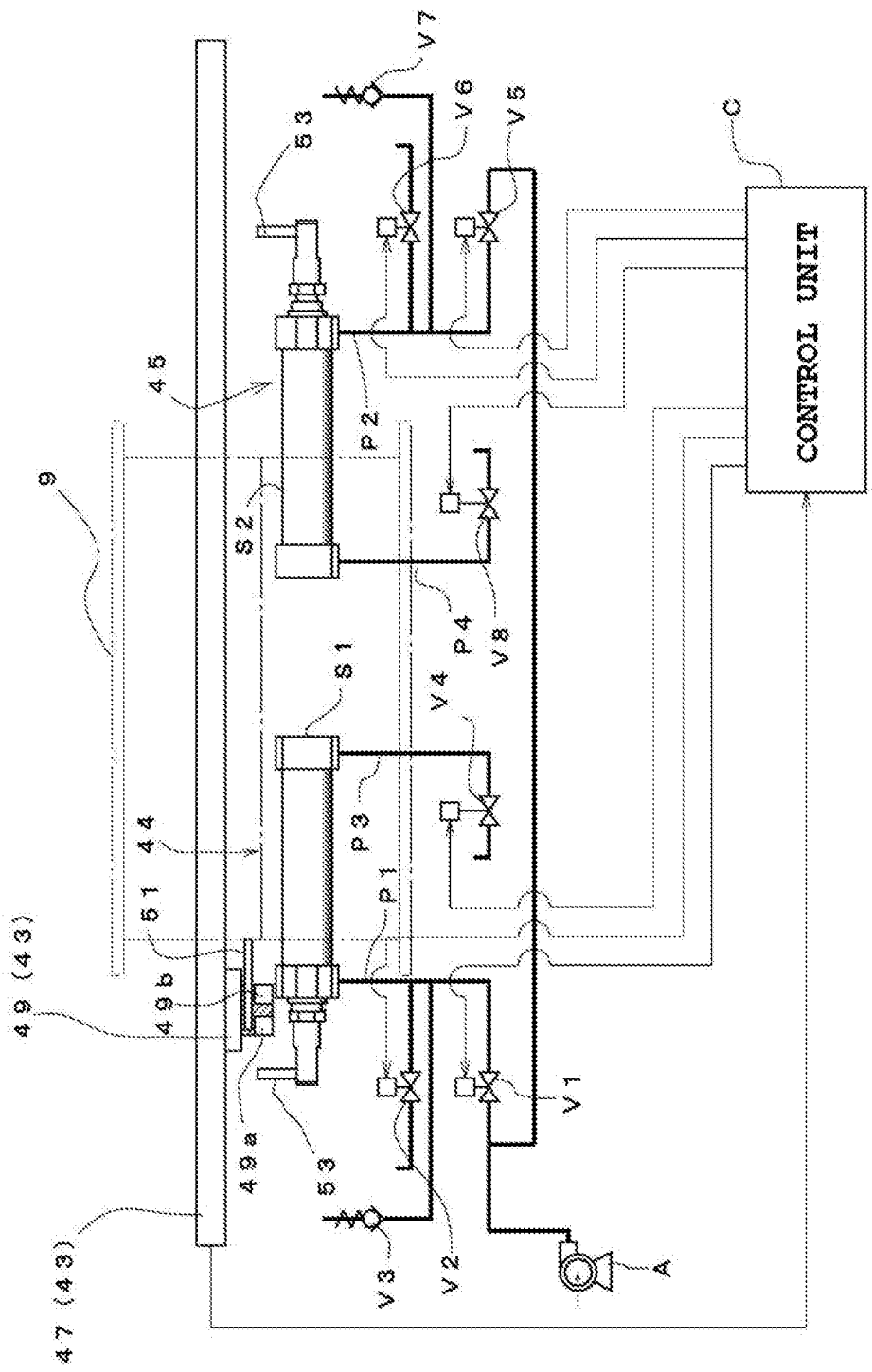
FIG. 6 is a schematic view of the embodiment of the mold changing apparatus according to the present invention, showing the procedure for changing the mold.

This stops the supply of the compressed air to the fluid pressure cylinder S1 (S3) and then disengages the engaging pin 53 (52) from the slider 49 (48) as illustrated in FIG. 6.

Even after the fluid pressure cylinder S1 (S3) disengages from the slider 49 (48), the conveyance of the mold (9, 11) is continued by the electric actuator 43 (42).

Then, when a conveyance position reaches a half of a conveyance distance, the conveyance speed of the mold (9, 11) is reduced by a decelerating force produced by the electric actuator 43 (42).

Figure 7:
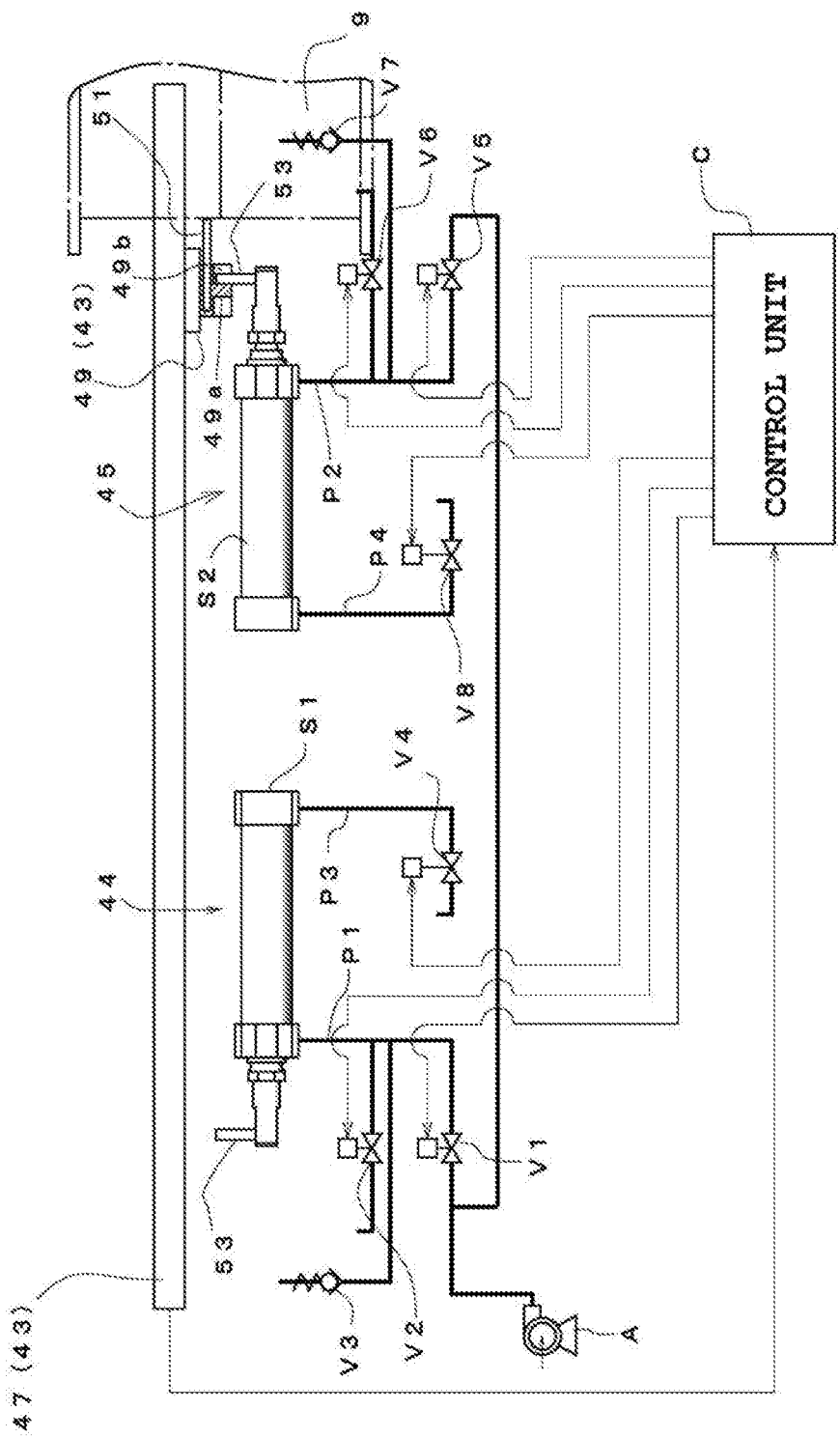
FIG. 7 is a schematic view of the embodiment of the mold changing apparatus according to the present invention, showing the procedure for mold replacement.

Before and after the timing at which the mold (9, 11) is decelerated by the electric actuator 43 (42), the engaging groove 49b of the slider 49 (48) opened forward in the conveyance direction is engaged with the engaging pin 53 of the other fluid pressure cylinder S2 (S4) held retracted as illustrated in FIG. 7.

Before the slider 49 (48) and the engaging pin 53 (52) are engaged with each other, each of the solenoid valves is controlled, for example, under the following condition 5.

Condition 5:
Solenoid valve V5 and V8: Open, and solenoid valve V6: Closed.

Such control brings the engaging pin 53 (52) an the slider 49 (48) into contact with each other before the mold (9, 11) reaches a reference position in the injection molding machine.

As described above, when the engaging pin 53 (52) comes into contact with the slider 49 (48), the fluid pressure cylinder S2 (S4) and the mold (9, 11) are coupled to each other. An inertial force of the mold (9, 11) acts on the fluid pressure cylinder S2 (S4) to extend the fluid pressure cylinder S2 (S4).

However, since the fluid pressure cylinder S2 (S4) is actuated to retract, drag against an external force that extends the fluid pressure cylinder S2 (S4).

Such drag on the fluid pressure cylinder S2 (S4) acts to assist in a decelerating action of the electric actuator 43 (42), which in turn makes a change in speed of the mold (9, 11) during deceleration large.

Herein, under the condition 5, although the decelerating action can be obtained by closing the solenoid valve V5 or V8, the decelerating force can be made constant by opening the solenoid valve V5 and V8.

Figure 8:
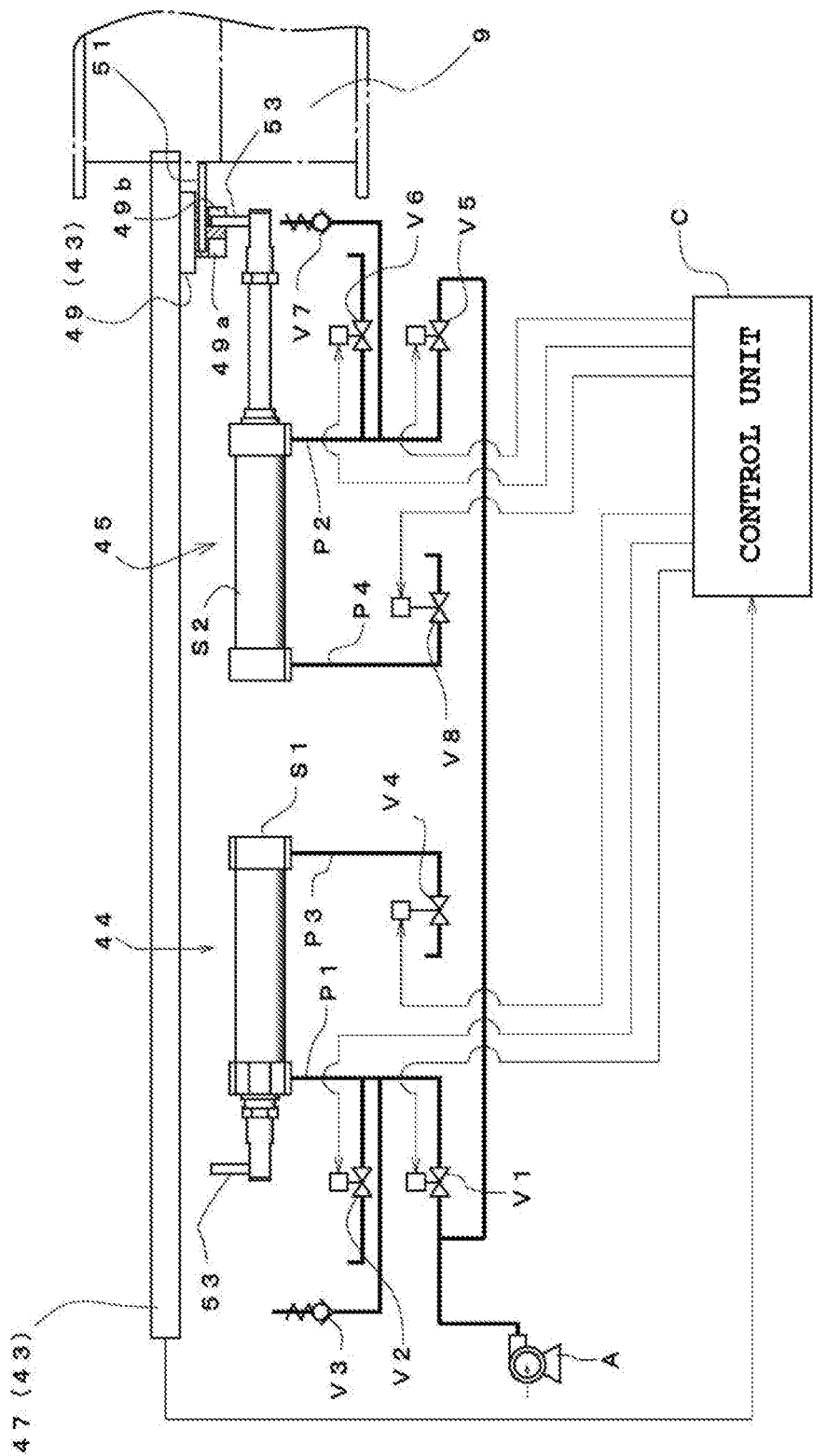
FIG. 8 is a schematic view of the embodiment of the mold changing apparatus according to the present invention, showing the procedure for mold replacement.

Such a decelerating action allows the mold (9, 11) to be quickly stopped at the reference position in the injection molding machine 1 as illustrated in FIG. 8.

After the mold (9, 11) is stopped at the reference position, for example, each of the solenoid valves is controlled under the following condition 6.

Condition 6:
Solenoid valve V5: Closed, and solenoid valves V6 and V8: Open.

This control eliminates thrust applied to the fluid pressure cylinder S2 (S4) to hold the mold (9, 11) in the stopped state.

However, when the mold (9, 11) is fixed by, for example, a mold clamp device to be able to receive the thrust applied to the fluid pressure cylinder S2 (S4), the control under the condition 5 described above may be continued.

In particular, when the mold (9, 11) is located in the injection molding machine 1, it is desirable not to release the compressed air since the mold (9, 11) is strongly held by the clamps.

When the mold (9, 11) is held by the clamps, it possible to make thrust applied by the electric actuator 43 (42) to zero regardless of the thrust applied to the fluid pressure cylinder S2 (S4) since the mold (9, 11) is held strongly by the clamps.

Furthermore, when the control under the condition 5 described above is performed, the compressed air is shut in between the fluid pressure cylinders S1 and S2 (S3 and S4) and the air compressor A. Hence the compressed air hardly leaks out, which makes it possible to repeatedly use the compressed air for mold acceleration and deceleration.

This in turn makes it possible to reduce energy for producing the compressed air.

On the other hand, in case that the mold is located on the mold changing apparatus 21 (20), and no clamp is prepared on the mold changing apparatus 21 (20), it is desirable that the compressed air in the fluid pressure cylinder S1 (S3) be released when the mold (9, 11) is stopped.

This is because, in a case where the thrust applied to the fluid pressure cylinder S1 (S3) is maintained, it is necessary to cause the electric actuator 43 (42) to produce thrust against the thrust applied to the fluid pressure cylinder S1 (S3) to stop the mold (9, 11).

When the thrust is continuously produced by the electric actuator 43 (42), load on the electric actuator 43 (42) increases, and power consumption also increases.

However, when the compressed air in the fluid pressure cylinder S1 (S3) is released, it is required that compressed air be newly produced to compensate for the compressed air thus released, which increases power consumption of the air compressor A.

Therefore, when the stop time of the mold (9, 11) is short, a method in which the compressed air is not released also an effective option.

Such an acceleration function and deceleration function can be implemented in the same manner for unloading the mold (9, 11) through actuations of the pair of fluid pressure cylinders S1 and S2 (S3 and S4) in reverse order to the above-described actuations.

It is extremely important how quickly the mold is stopped in an emergency since the mold is heavy.

The fluid pressure cylinders S1 and S2 (S3 and S4) usually assist in both acceleration and deceleration made by the electric actuator 43 (42) with a constant force. Yet it can produce a high decelerating force by closing the solenoid valves V5, V6 and V8 in an emergency stop during loading or closing the solenoid valves V1, V2, and V4 in an emergency stop during unloading to increase the pressure to the limit.

However, the maximum allowable pressure of the fluid pressure cylinders S1 and S2 (S3 and S4) is predetermined, so that, the relief valves V3 and V7 are actuated to release the compressed air in the fluid pressure cylinders S1 and S2 (S3 and S4) to make the internal pressure equal to or less than the maximum allowable pressure when the internal pressure reaches the maximum allowable pressure.

This makes it possible to prevent the fluid pressure cylinders S1 and S2 (S3 and S4) from being damaged.

After the emergency stop, closing the solenoid valves V1 and V5 and opening all the other solenoid valves make it possible to prevent the compressed air from remaining in the fluid pressure cylinders S1 and S2 (S3 and S4) and thus prevent unintentional movement of the mold (9, 11).

Note that the type, form, and the like of each of the components shown in the above-described embodiment are merely examples, and various changes may be made based on design requirements and the like.

For example, although the description has been given of the example where the fluid pressure cylinders S1, S2, S3, and S4 of a pneumatic type are used, fluid pressure cylinders of a hydraulic type may be used instead.

Further, the single-acting cylinder of a retracting type may be replaced with a single-acting cylinder of a pushing type, or a double-acting cylinder may be used.

As a main conveyance unit, various motors such as stepping motors may be employed instead of servomotors. A rack and pinion may be employed instead of a ball screw.

Further, the main conveyance unit may be a linear motor or the like, or alternately, a hydraulic cylinder or pneumatic cylinder having a positioning function.

The invention claimed is:

1. A mold changing apparatus provided side by side with an injection molding machine, comprising:
    a first mold changing apparatus that is configured to generate a driving force for loading a mold into the injection molding machine, and a second mold changing apparatus that is configured to generate a drive force for unloading the mold from the injection molding machine;
    the first mold changing apparatus and the second mold changing apparatus each includes:
        an actuator that forms a linear conveyance path and a towing unit configured to move the mold along the linear conveyance path and a linear bearing configured to movably mount the towing unit;
        a pair of power assist units arranged along the actuator and opposite to each other;
        wherein each one of the power assist units includes a fluid pressure cylinder that comprises either a pneumatic cylinder or a hydraulic cylinder, the fluid pressure cylinder includes a piston rod with a tip, and the tip includes an engaging portion that is configured to be detachably engaged with the towing unit; and
        the towing unit is provided with a pair of engaging grooves opened forward and backward in a conveyance direction to engage with each engaging portion of each fluid pressure cylinder.

2. The mold changing apparatus according to claim 1, wherein each fluid pressure cylinder is a single-acting cylinder of a retracting type.

3. The mold changing apparatus according to claim 1, wherein each fluid pressure cylinder is a double-acting cylinder.

* * * * *